Sept. 15, 1964    J. M. GARNETT, JR    3,148,432
MORTAR SPREADER
Filed May 8, 1962    3 Sheets-Sheet 1
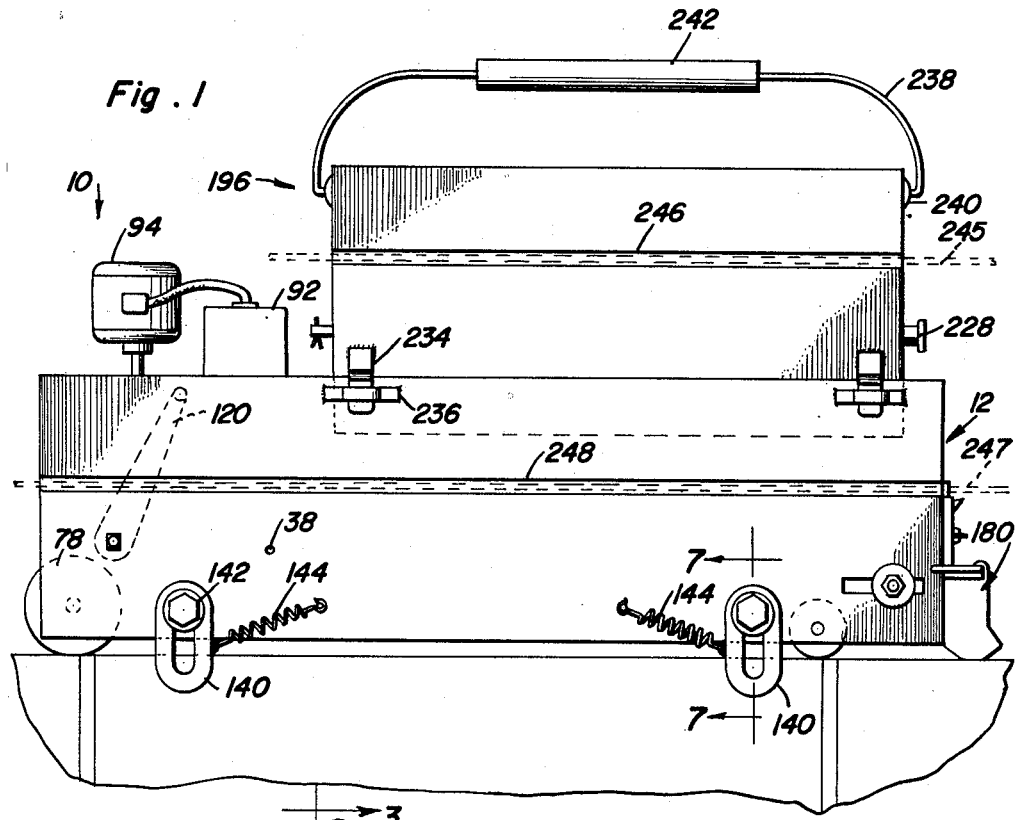
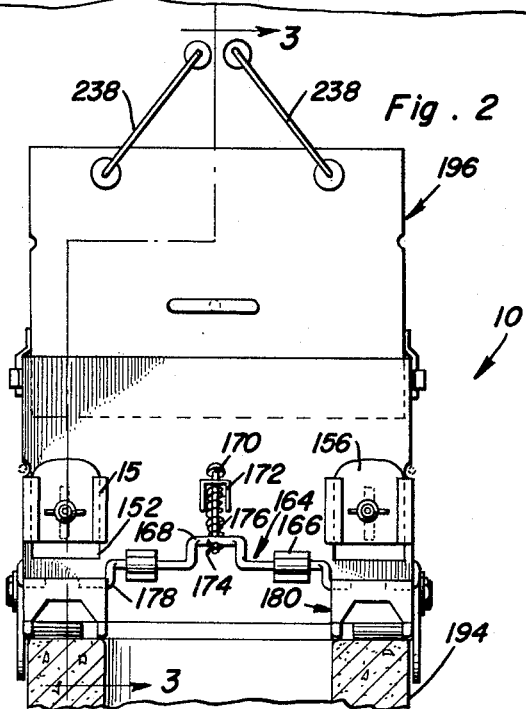
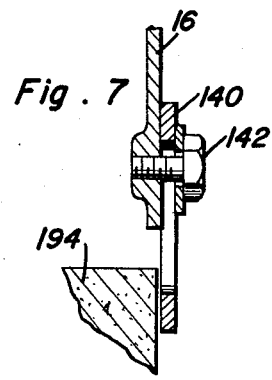
John M. Garnett, Jr.
INVENTOR.

Sept. 15, 1964
J. M. GARNETT, JR
3,148,432
MORTAR SPREADER
Filed May 8, 1962
3 Sheets-Sheet 2
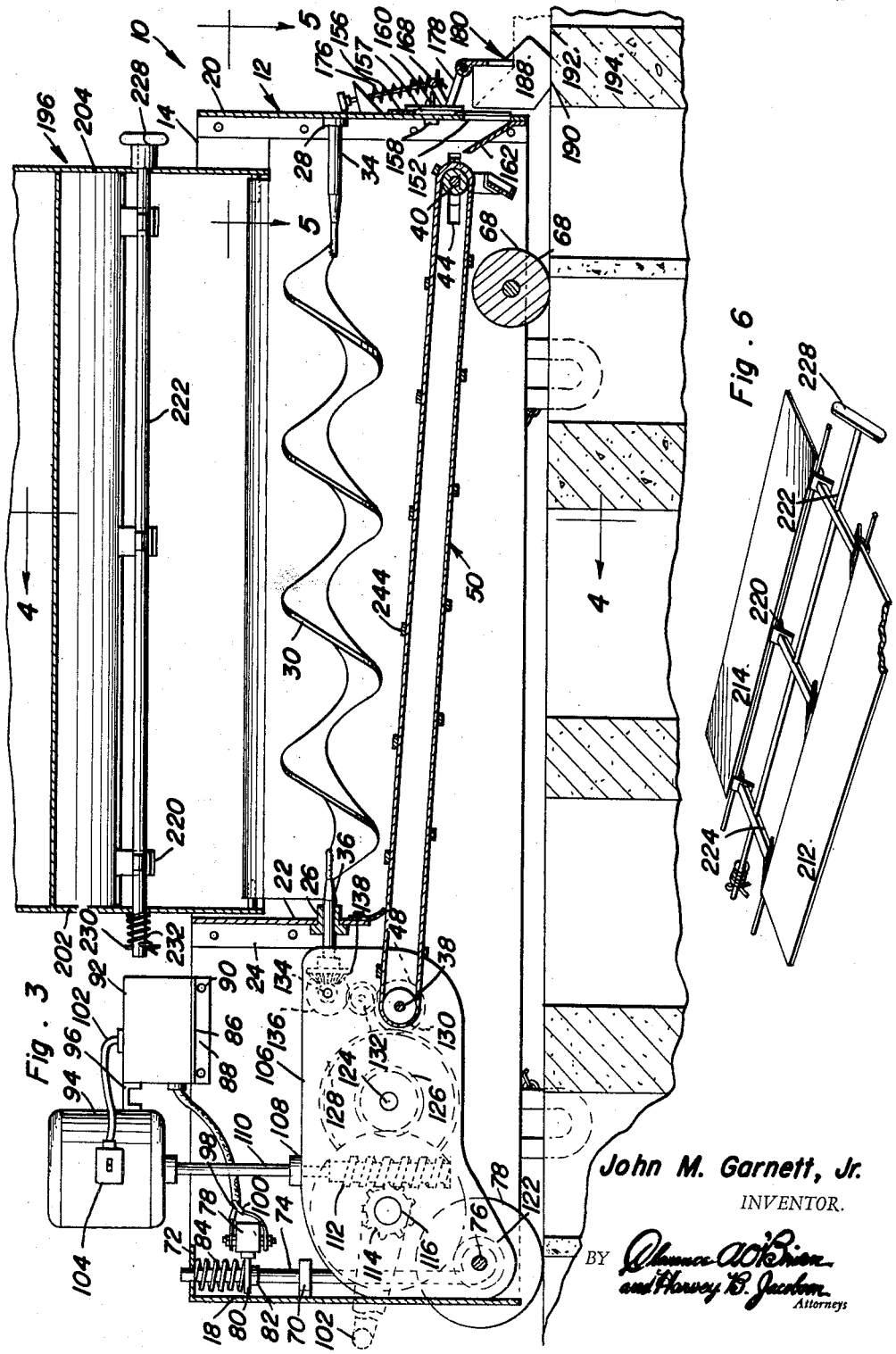
John M. Garnett, Jr.
INVENTOR.

Sept. 15, 1964   J. M. GARNETT, JR   3,148,432
MORTAR SPREADER
Filed May 8, 1962   3 Sheets-Sheet 3
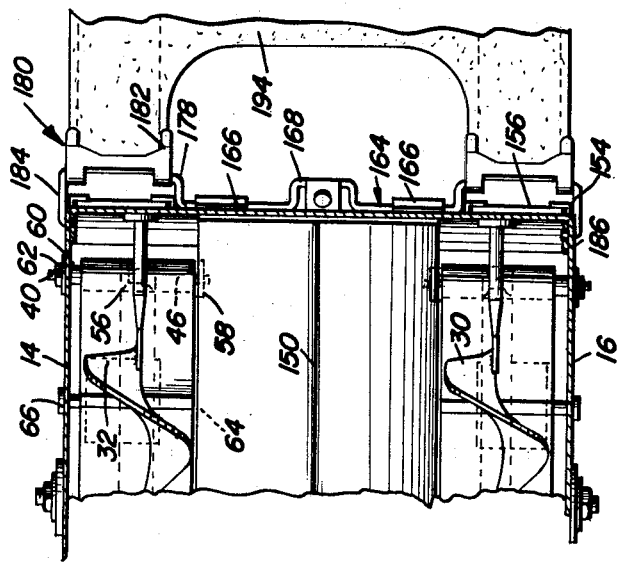
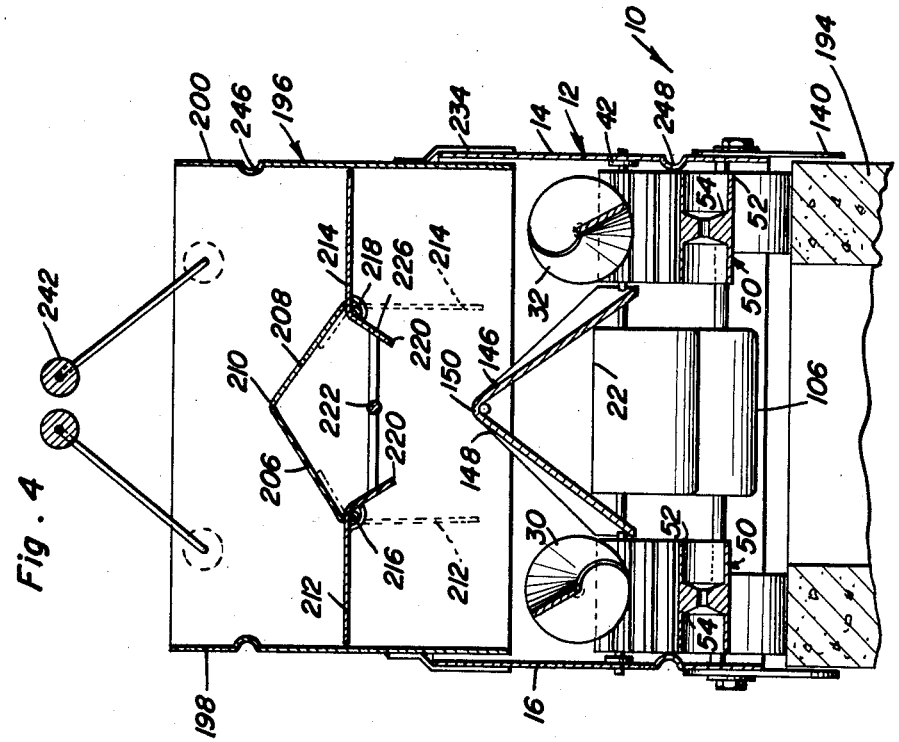
John M. Garnett, Jr.
INVENTOR.
BY *(signatures)*
Attorneys

United States Patent Office 3,148,432
Patented Sept. 15, 1964

3,148,432
MORTAR SPREADER
John M. Garnett, Jr., 96 S. 2nd, Camden, Ohio
Filed May 8, 1962, Ser. No. 193,676
16 Claims. (Cl. 25—118)

This invention relates to a device for automatically dispensing and spreading a highly viscous material, and more particularly to a device for spreading mortar on the upper surface of a row of precast blocks or bricks.

Accordingly, it is the primary object of the invention to provide a power driven or hand propelled device for automatically dispensing and spreading mortar on the upper surface of a row of blocks or bricks.

It is another object of the invention to provide a mortar spreader having adjustable trowel means for smoothing and troweling the mortar as it is dispensed from the rear of the spreader.

It is still another object of the invention to provide a mortar spreader having adjustable gates at the rear thereof for regulating the rate of flow of the mortar from the spreader.

It is yet another object of the invention to provide a mortar spreader having power operated means for dispensing mortar which are positively connected by transmission means to power driven propelling means for the spreader so that the mortar is dispensed from the mortar spreader in direct proportion to the speed thereof.

It is another object of the invention to provide a mortar spreader having an improved loading bucket removably secured thereto.

It is a further object of the invention to provide a power driven mortar spreader which has means for automatically shutting off the driving motor thereof when the spreader becomes empty of mortar. The purpose of this is so that when the spreader is empty of mortar it will automatically stop thereby eliminating any skips or broken sections in the bed of mortar being spread.

It is another object of the invention to provide a mortar spreader having guide means thereon for automatically guiding the spreader along the upper surface of a masonry wall whereby the guide means are pivotally connected to the spreader so as to automatically retract when the spreader passes a pilaster or intersecting wall.

It is yet another object of the invention to provide a mortar spreader which is automatic in operation, but yet economical to manufacture, reliable in use, and requires a minimum of maintenance.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a side elevational view of the mortar spreader mounted on the upper surface of a masonry wall;

FIGURE 2 is an end elevational view;

FIGURE 3 is a vertical cross-sectional view taken substantially on the plane of line 3—3 in FIGURE 2;

FIGURE 4 is a vertical cross-sectional view taken substantially on the plane of line 4—4 in FIGURE 3;

FIGURE 5 is a horizontal cross-sectional view taken substantially on the plane of line 5—5 in FIGURE 4;

FIGURE 6 is a perspective view of a detail; and

FIGURE 7 is an enlarged vertical cross-sectional view taken substantially on the plane of line 7—7 in FIGURE 1.

As illustrated in the drawings, the mortar spreader 10 includes a rectangular housing 12 composed of a pair of parallel vertically extending side walls 14 and 16 connected together by a vertically extending front wall 18 and a rear wall 20 parallel thereto. A transverse partition plate 22 extends between the side walls 14 and 16 and is connected thereto by end flanges 24 on the partition plate riveted to the side walls.

The lower edge portion of the partition 22 has a pair of laterally spaced bores therein which receive anti-friction bushings 26. The bushings may be threaded within the bores or welded to the plate 22. The rear wall 20 has a pair of cup-shaped anti-friction bushings 28 welded thereto in axial alignment with the bushings 26. A pair of augers 30 and 32 extend between the bushings 26 and 28 and are rotatably supported therein by means of a pair of shafts 34 and 36 secured to the ends of the augers and rotatably journaled in the bushings. Preferably, the shafts are attached to the augers by removable means such as screws, not shown, so that the augers may be removed for cleaning and repair when desired.

A pair of parallel, horizontal shafts 38 and 40 extend between and through the side walls 14 and 16. The ends of the shaft 38 also extend through and are journaled in anti-friction washers 42 which are welded to the inner surfaces of the side walls. The ends of the shaft 40 extend through horizontally elongated rectangular slots 44 formed in the rear portions of the side walls. The shaft 40 has a pair of cylindrical rollers 46 rotatably journaled on each end thereof while the shaft 38 has a pair of similar rollers or pulleys 48 secured to its opposite ends. Each forward roller 48 is longitudinally aligned with one of the rear rollers or pulleys 46, and each pair of these rollers are encircled by an endless V-belt 50. Each of the V-belts 50 includes a flat outer portion 52 secured to a tapered central inner portion 54. The tapered inner portion of each belt extends into tapered central grooves 56 in the belt pulleys. The shaft 40 has a washer 58 and a bushing 60 welded thereto adjacent the ends of each pulley 46 for preventing axial movement of the pulley on the shaft. The shaft 40 is adjustably secured to the housing 12 by means of nuts 62 threaded on the ends of the shaft and clamping the side walls of the housing between the nuts and bushings 60.

A rear axle 64 extends horizontally between the lower edges of the side walls 14 and 16. The ends of the axle 64 extend through bores in the side walls and are provided with outer heads 66 which prevent axial movement of the axle. A pair of wheels 68 are secured to each end of the axle and rotatably support the housing 12.

As shown in FIGURE 3, the front end of each side wall is provided with an apertured ear 70 and a horizontal flange 72 parallel thereto. Each flange and ear on each side of the housing is provided with a vertical bore which slidably receives a vertical shaft 74. The lower end of each shaft 74 is provided with a circular head which has a horizontal bore therein which rotatably receives an end of a front axle 76. A front wheel 78 is secured to each of the outer ends of the axle 76. A toggle switch 79 is secured to the inside surface of the side wall 14 adjacent the right shaft 74. The toggle switch 79 is provided with a yoke or Y-shaped toggle arm 80 which slidably receives the upper end of the right shaft 74. The shaft 74 has a circular collar 82 secured thereto below the yoke 80 and a coil spring 84 is normally compressed by the weight of the mortar spreader between the flange 72 and the yoke 80.

A battery support plate 86 extends between the upper edges of the side walls 14 and 16 and is secured thereto by vertical end flanges 88 and screws 90. A housing 92 containing a battery is secured to the upper surface of the support plate 86. The housing of a conventional electric motor 94 is secured to the battery housing 92 by means of a channel member 96. The battery within the housing 92 is connected in series with the motor 94 by means of conductors 98, 100 and 102. The conductors 98 and 100 are connected in series with the switch 79 as shown in FIGURE 3, and the circuit between the battery and motor is completed by a ground circuit including the channel member 96 connecting the housings of the battery and motor. The connection between the motor and conduit 102 may be opened or closed by a control switch 104. A transmission housing 106 is connected to the front wall 18 and has a journal 108 on its top surface which rotatably receives the drive shaft 110 of the electric motor 94. The lower end of the drive shaft 110 is secured to a worm gear 112 which meshes with the teeth of a pinion 114 journaled on a horizontal shaft 116 in the transmission housing 106. A gear 118 is also fixed to the shaft 116 within the housing 106 and the shaft 116 extends through a bore in the side of the side wall 14. A hand crank 120 is removably secured to the outer end of the shaft 116. The front axle 76 also extends through the lower portion of the housing 106, and has a pinion 122 fixed thereto within the transmission housing which is in driving engagement with the gear 118. A horizontal shaft 124 is journaled in the transmission housing 106 and has secured thereto a small gear 126 and a larger gear 128. The shaft 38 extends through the rear portion of the housing 106 and has fixed to its central portion a pinion 130. The pinion 130 is in driving engagement with the large gear 128 while the small gear 126 is in driving engagement with the ear 118. An idler gear 132 is also journaled in the housing 106 in driving engagement with the pinion 130. An elongated shaft 134 extends through the side walls of the housing 106 and is journaled therein. Three small gears 136 are secured to the shaft 134 in spaced relationship. The central gear 136 is within the housing 106 and in driving relation with the idler gear 132, while the two outer gears 136 are bevel gears which are in driving relationship with bevel gears 138 secured to the ends of the auger shafts 36.

A pair of oblong washers 140 are pivotally connected to the outer sides of the side walls 14 and 16 by bolts 142 threaded in the side walls. A coil spring 144 extends diagonally between each of the washers 140 and a side wall of the housing 12 as shown in FIGURE 1 so as to always maintain the washers 140 in the vertical position as illustrated. The washers are also urged by gravity so that the bolts 142 extend through the upper portions of the elongated slots in the washers.

A partition of inverted V-shaped cross-section extends between the upper inside edges of the belts 50 and comprises sloping side walls 146 and 148. As shown in FIGURE 4, the side walls 146 and 148 are jointed at their upper edges 150 while the lower edges thereof terminate flush with the upper inside edges of the belts. The ends of the side walls 146 and 148 are secured to the plate 22 and the rear wall 20.

A rectangular aperture 152 is provided on each side of the rear wall 20 adjacent the lower edge thereof and in longitudinal alignment with the belts 50. A pair of vertically extending angle members 154 are secured to the outer surface of the rear wall 20 adjacent opposite ends of each of the apertures 152 so as to provide a guide for a vertically adjustable valve plate 156. Each valve plate 156 has a vertical aperture 157 extending therethrough which receives a bolt 158 extending through a bore in the rear wall 20. A wing nut 160 is threaded on each of the bolts 158 for adjustably locking one of the valve plates 156 in adjusted position. By loosening the wing nut 160 and vertically sliding the valve plate 156, the effective opening of the aperture 152 may be adjusted as desired.

A canted guide plate 162 is secured to the rear wall 20 adjacent the lower edge of the openings or apertures 152 so as to extend upwardly and forwardly adjacent the rear end of one of the belts 50.

A crankshaft 164 is journaled on the rear wall 20 by means of a pair of journal blocks 166 secured to the outer surface of the rear wall. The crankshaft 164 has a central U-shaped crank 168 extending upwardly and rearwardly therefrom. The center of the crank 168 has a bore therethrough which receives the shank of a headed pin 170. The upper end of the pin 170 slidably extends through a bore in a horizontal shelf 172 secured to the rear wall 20. The lower end of the pin 170 has a transverse bore therethrough which receives a cotter pin 174. A coil spring 176 is compressed between the crank 168 and the shelf 172 thereby urging the crankshaft 164 in a clockwise direction as viewed in FIGURE 3. Each end of the crankshaft 164 is also provided with a crank 178 which is journaled in the inner side of a trowel 180. Each of the trowels 180 comprises a generally U-shaped plate 182 which extends downwardly and rearwardly from the rear wall 20. The upper end of each of the plates 182 is provided with a pair of aligned cylindrical flanges, one of which rotatably receives the crank 178 and the other of which rotatably receives the end of a U-shaped link 184. The forward end of each link 184 is pivotally connected within a bore in one of the side walls 14 or 16. The rear ends of the side walls are reinforced by reinforcing plates 186. Each of the U-shaped plates 182 has a pair of parallel side edges which are secured to a pair of parallel side plates 188 which extend forwardly and downwardly from the U-shaped plate as shown in FIGURE 3. As shown in FIGURE 3, the spring 176 urges the shaft 164 in a clockwise direction so as to urge the forward vertical edges of the side plates 188 against the surface of the rear wall 20. As shown in FIGURE 3 the side plates 188 are shaped generally like a delta wing and have a flat bottom edge 190 adapted to engage the upper surface 192 of a masonry wall 194.

The mortar spreader 10 is adapted to be filled by means of a mortar box 196. The mortar box 196 is of generally rectangular configuration and comprises a pair of parallel vertical side walls 198 and 200 connected by forward and rear walls 202 and 204. The front and rear walls are connected at their central portions by an inverted V-shaped partition comprising sloping plates 206 and 208 converging at a point 210. A pair of doors 212 and 214 are pivoted to the outer edges of the plates 206 and 208 by means of pivot pins 216 and 218 which extend through deflected arcuate portions of the plates and doors and thereby function as hinges for the doors. As shown in FIGURE 6, each of the doors is provided with a plurality of inwardly extending and downwardly deflected stop flanges 220. A circular shaft 222 extends midway between the flanges 220 and is journaled in bores in the end walls 202 and 204. The shaft 222 extends through the centers of a plurality of cam blocks 224 and is secured thereto. Each of the blocks 224 has a cam surface 226 which normally engages the stop flanges 220 and thereby locks the doors 212 and 214 in the closed position as illustrated in solid lines in FIGURE 4. The rear end of the shaft 222 is secured to an operating handle 228 while the forward end thereof is provided with a diametrical bore which receives a cotter pin 230. A coil spring 232 is compressed between the cotter pin 230 and the forward wall 202 so as to urge the shaft 222 forwardly whereby the cam blocks 224 are in lateral alignment with the stop flanges 220.

As shown in FIGURE 4, the box 196 normally is telescopically received within the upper surface of the housing 12. A pair of support flanges 234 are secured to opposite sides of the box 196 and are formed so that the lower ends thereof overlap the outer surface of the housing 12 and thereby support the box on the upper edge of the housing 12. The housing 12 is also provided with a plurality of U-shaped receptacles 236 which receive the lower ends of the support flanges 234.

A pair of handles comprising a pair of generally U-shaped rods 238 extend longitudinally over the upper portion of the box 196. The ends of the rods 238 are deflected horizontally and are pivotally mounted in journals 240 secured to the ends of the box. A tubular hand grip 242 is rotatably journaled on its upper portion of each of the U-shaped rods 238.

Each of the belts 50 is provided with a plurality of parallel spaced transversely extending lugs 244 of rectangular cross-section. The side walls of the box 106 and the housing 12 are provided with longitudinally extending arcuate grooves 246 and 248 for receiving the guide strings used in the construction of masonry walls.

If desired, the entire mortar spreader 10 may be made adjustable in width whereby it may be effectively used for spreading mortar on walls of different thicknesses.

The augers 30 and 32, the partitions 146, 148, 206 and 208, the doors 212 and 214 and all of the other surfaces of the mortar spreader which are exposed to the mortar are preferably covered with a very smooth plastic compound so as to prevent the mortar from adhering to the various parts of the spreader when the mortar dries.

In operation, the mortar spreader 10 is placed on the upper surface of the top row of blocks of the wall 194 so that the sides of the spreader are substantially in alignment with the outer sides of the wall as shown in FIGURE 4 and the guide washers 140 overlap the opposite sides of the wall. The doors 214 and 212 of the mortar box 196 are closed so that the mortar box may then be filled with mortar and placed upon the top of the spreader as illustrated in the drawings. The operating handle 228 is then pulled rearwardly so as to compress the spring 232 and move the cam blocks 224 out of alignment with the stops 220 whereupon the weight of the mortar on the doors 212 and 214 will force the doors to move downwardly to the dotted line positions shown in FIGURE 4. Of course, the mortar in the box 196 then drops onto the augers 30 and 32 in the housing 12. The sloping plates 146 and 148 effectively guide the wet mortar to the augers. Switch 104 is then closed so as to supply electric energy to the motor 94 whereupon the motor drives the front wheels 78 and the augers 30 and 32 by means of the gearing previously disclosed. Rotation of the wheels 78 in a counterclockwise direction as viewed in FIGURE 3 causes the mortar spreader to move forwardly while the augers are power driven so as to force the wet mortar to the rear of the housing 12 and adjacent the apertures 152. The belts 50 are also power driven so as to move the mortar to the apertures 152. The movement of the mortar by the belts and the augers causes a pressure in the mortar in the vicinity of the apertures 150 whereupon the mortar is forced through the apertures and in between the side plates 188 of the trowels 180. As the spreader moves forwardly, the mortar is then deposited on the upper surface of the wall 194 in two parallel streams or ridges. These streams of mortar are then properly troweled and formed by the U-shaped plates 184 which are urged downwardly on the mortar by the spring 176 and the crankshaft 168. Of course, the size of the streams of mortar may be changed as necessary by adjusting the openings 152 by means of the plates 156. If desired, the mortar box 196 may be removed from the mortar spreader before it is put into operation.

Whenever the mortar spreader passes a pilaster or an intersecting wall, the guide washers 140 may pivot rearwardly or upwardly, but will always be returned to a proper position by gravity and the springs 144.

When the mortar spreader becomes substantially empty, the springs 84 will elevate the front portion thereof whereupon the switch 78 will be elevated with the housing 12 and the switch toggle 80 will be urged downwardly relative to the switch whereupon the switch will be opened for deenergizing the motor 90 to stop the spreader.

If no electric power is available for the motor 94, the spreader may be operated manually by attaching the removable hand crank 120 and rotating the shaft 116 by manual means in an obvious manner. Alternatively, the motor 94 may be operated by a conventional 110 volt alternating current power source instead of the battery 92 if desired.

As shown in FIGURE 3, the forward and rear ends of the plates 146 and 148 may be notched to provide ample room for the forward and rear walls of the mortar box 196.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A spreader for spreading highly viscous material such as mortar or other cementitious fluid materials or the like comprising a container for the plastic material, roller means journalled on the container and adapted to rotatably support it on the upper surface of a masonry wall, said container being provided with exhaust means for conducting the material from the container to the upper surface of the wall, movable conveyor means within the container, means operating said conveyor means whereby the material in the container is forced through the exhaust means for deposit on said upper surface, motor means on said container for driving said roller means, transmission means connecting said motor means and the conveyor operating means whereby the conveyor means and the roller means are each operated at a speed directly proportional to the speed of the other so as to deposit an equal amount of material on any given length of said upper surface regardless of the speed of operation of said motor means.

2. A device as defined in claim 1 wherein said conveyor means includes at least one auger.

3. A device as defined in claim 1 wherein said conveyor means includes an endless belt.

4. A device as defined in claim 1 wherein the lower portion of said container is provided with longitudinal channels, the bottoms of said channels comprising the upper surface of an endless belt having rear surfaces adjacent said exhaust means, an auger above each belt, the augers and belts comprising the conveying means.

5. A device as defined in claim 4 wherein said channels are separated by partitions of inverted V-shaped cross-section.

6. A device as defined in claim 4 wherein said exhaust means are located at the rear of said channels, pivoted trowels on the outside of said container in alignment with said exhaust means.

7. A device as defined in claim 1 wherein guide means are pivotally mounted on opposite sides of said container, means urging said guide means to a position whereby portions thereof extend below the bottoms of said roller means so as to overlap the sides of said wall.

8. A spreader for spreading highly viscous material such as mortar or other cementitious fluid materials or the like comprising a container for the plastic material, roller means journalled on the container and adapted to rotatably support it on the upper surface of a masonry wall, said container being provided with exhaust means for conducting the material from the container to the upper surface of the wall, movable conveyor means within the container, means operating said conveyor means whereby the material in the container is forced through the exhaust means for deposit on said upper surface, motor means on said container for driving said roller means, transmission means connecting said motor means and the conveyor operating means whereby the conveyor means and roller means are each operated at a speed directly proportional to the speed of the other so as to deposit an equal amount of material on any given length of said upper surface regardless of the speed of operation of said motor means, said roller means comprising a plurality of wheels, said container supported on at least one of said wheels by spring means, switch means connected to and controlling said motor means, said switch means mounted on the spreader so as to be operated by relative vertical movement between said container and said one wheel whereby said motor is cut off when said container is empty of material.

9. A device as defined in claim 8 wherein a removable filling receptacle is supported on said container, trap doors in the bottom of said receptacle, means connected to said doors for locking and unlocking same whereby the doors may be unlocked for dumping the material in said receptacle into said container.

10. A device as defined in claim 9 wherein the inside surfaces of said container and receptacle are coated with a smooth substance to prevent adherence of said material.

11. A spreader for cementitious material or the like comprising a container for such material, wheel means longitudinally spaced on said container for supporting the container movably on a surface on which a layer of cementitious material is to be spread, means on said container drivingly connected to said wheel means for motivating the container along a surface, an outlet opening for cementitious material at one end of said container, a combined belt-type and auger-type conveyor oriented longitudinally in the container for conveying cementitious material to the outlet opening with the auger conveyor being disposed generally in overlying relation to the belt conveyor, means drivingly interconnecting the belt conveyor and auger conveyor with the wheel drive means whereby the quantity of discharge of cementitious material is proportional to the speed of movement of the container.

12. The structure as defined in claim 11 wherein both the belt-type conveyor and auger conveyor are inclined longitudinally downwardly and to the rear with the belt conveyor forming a portion of the bottom for the container and the auger conveyor serving to agitate the cementitious material in the container.

13. The structure as defined in claim 12 wherein the container is provided with an adjustable trowel rearwardly of the outlet for trowelling the cementitious material discharged thereby, a sliding closure gate for the outlet opening for controlling the quantity of cementitious material discharged.

14. The structure as defined in claim 11 wherein said container includes a pair of depending guide lugs on each side thereof for engaging the side surfaces of a masonry wall for guiding the container along such a wall.

15. The structure as defined in claim 14 wherein said driving means includes an electric motor, switch means connected to the electric motor for selectively connecting the motor to a source of power, and means operative in response to emptying of the container to render the switch operative to break the circuit between the source of power and the motor for stopping the spreader when the cementitious material has been completely discharged therefrom.

16. The structure as defined in claim 14 together with a supply hopper having the bottom end therein received within the top of the container, a discharge gate in the supply hopper for discharging material therefrom into the container.

References Cited in the file of this patent

UNITED STATES PATENTS

| | | |
|---|---|---|
| 335,223 | Hexamer | Feb. 2, 1886 |
| 1,168,370 | Anderson | Jan. 18, 1916 |
| 1,274,548 | Holnagel et al. | Aug. 6, 1918 |
| 1,594,775 | Greslen | Aug. 3, 1926 |
| 1,984,651 | Meves | Dec. 18, 1934 |
| 2,341,691 | Ciceske | Feb. 15, 1944 |
| 2,600,641 | Guyer | June 17, 1952 |
| 3,045,312 | Tolbert et al. | July 24, 1962 |
| 3,070,261 | Smalley | Dec. 25, 1962 |